March 3, 1964
J. H. ALLAN ETAL
3,123,593
METHOD OF REDUCING THE WATER SOLUBILITY
OF BLOOD SOLIDS FOR ADHESIVE USE BY
STEAM TREATMENT
Filed Sept. 25, 1959
2 Sheets-Sheet 2
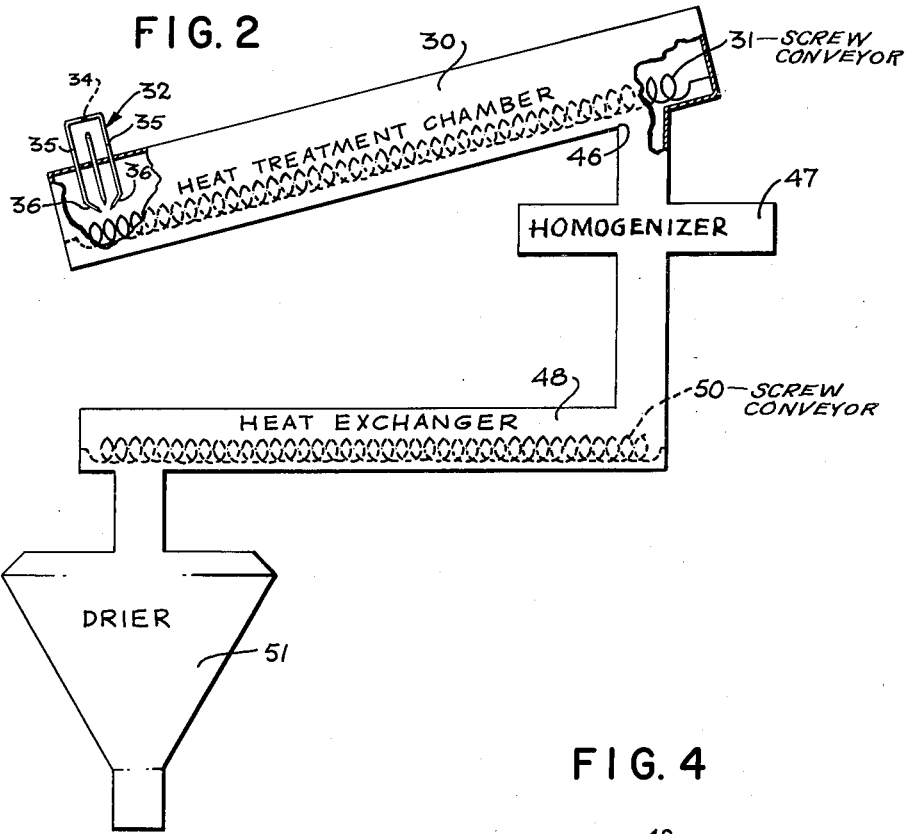
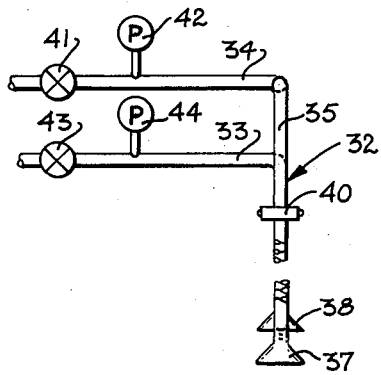
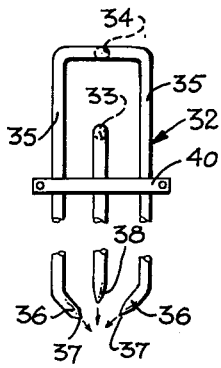
INVENTOR.
John H. Allan
Gerald W. Lee
BY
Smith & Tuck
ATTORNEYS United States Patent Office 3,123,593
Patented Mar. 3, 1964

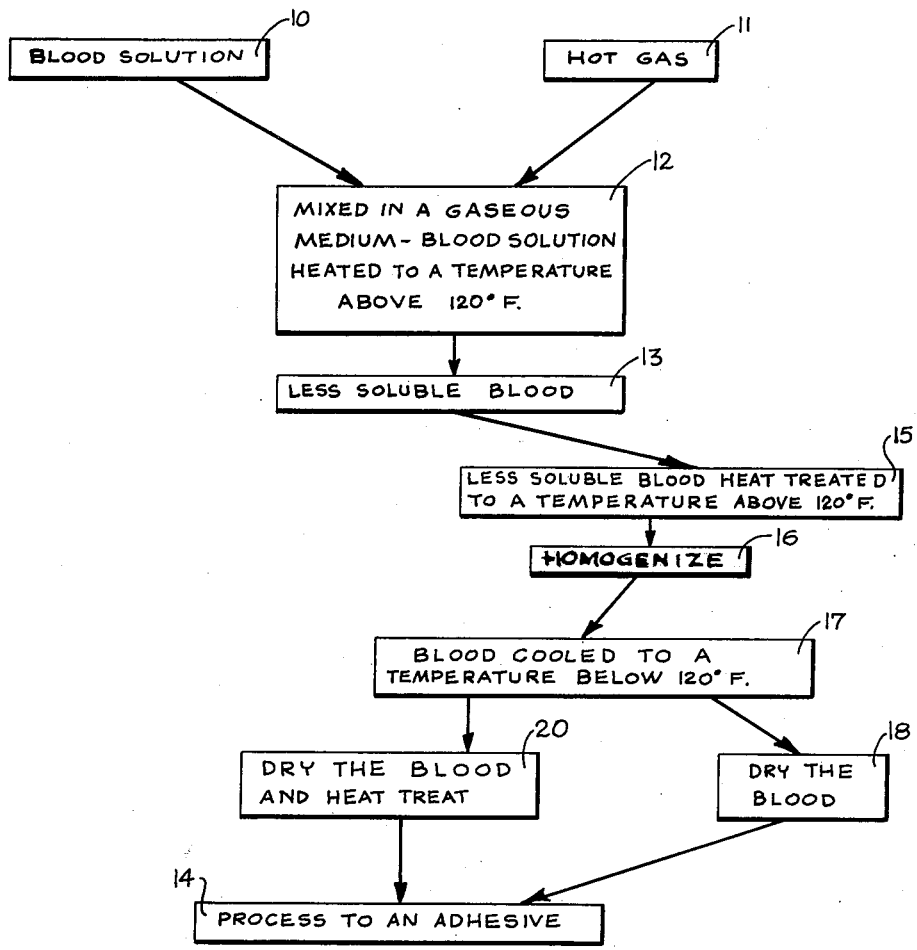

3,123,593
METHOD OF REDUCING THE WATER SOLUBILITY OF BLOOD SOLIDS FOR ADHESIVE USE BY STEAM TREATMENT
John H. Allan, Hillsborough, Calif., and Gerald W. Lee, Seattle, Wash., assignors, by mesne assignments, to Pacific Resins & Chemicals, Inc., Seattle, Wash., a corporation of Washington
Filed Sept. 25, 1959, Ser. No. 842,399
3 Claims. (Cl. 260—112)

This invention relates to a process for treating blood for adhesive purposes and, more particularly, to a process for decreasing the solubility of blood, to making a less soluble blood of uniform lowered solubility, and to a continuously operable process.

It is well-known that blood is a product of the meat processing industry and, among other things, is used in livestock feed, as a source of nitrogen in fertilizers, and as a source of protein material in the manufacture of adhesive bases and adhesives.

In the manufacture of adhesives blood is preferably processed to decrease its solubility in water. Fresh animal blood is essentially fully soluble in water but is sensitive to elevated temperatures. For example, when dilute liquid blood is heated to a temperature above about 120° F. the water solubility of the blood protein is reduced. When the time of heating above about 120° F. is prolonged or when the temperature is further elevated, say to about 180° F., the blood protein becomes progressively more insoluble and eventually will precipitate. When the blood solids content of a blood solution is above about 14 percent by weight the insolubilized protein absorbs most of the water present and a semi-solid mass forms composed principally of insoluble blood solids and water.

In decreasing the solubility of blood for adhesive uses, it is desirable to maintain a solubility range within certain limits. For example, blood having from about 50 percent to 95 percent of the total blood solids insoluble in water is useful in an adhesive for bonding wood veneer to make plywood.

It has been found especially advantageous to reduce blood solubility by means of "wet heat" to provide a more stable final glue viscosity. This insures substantially uniform and relatively unvarying characteristics of the glue-mix in storage or on the glue-mix spreading machinery.

One method of reducing the water solubility of soluble blood is to add hot water to the aqueous blood solutions while the blood is mechanically stirred by an agitator within a tank. Blood may also be reduced in solubility in aqueous medium by applying direct heat to the vessel while agitating the blood. These are generally known as batch processes and involve the "wet heat" concept.

In another process liquid blood is first spray dried to form dry soluble blood particles and then the dry particles are heated in contact with a hot metal surface to reduce their solubility in water.

In contrast with these processes, this invention is directed to decreasing the water solubility of blood by continuously mixing and heating a substantially uniform stream of soluble blood with steam within a gaseous medium. This process can be practiced close to the slaughter house or at a central location remote from the point of end use.

It will be seen that this process avoids performing the heating of blood at the point of use, i.e., plywood mill. It also avoids excessive dilution of the blood with water, the formation of odors characteristic of heating dry blood to high temperatures, and it provides other advantages more particularly brought forth in the following specific description, drawings and claims.

In the drawings:

FIGURE 1 is a flow diagram of the process for treating a blood solution to form a less soluble blood.

FIGURE 2 is a schematic diagram of the apparatus employed for transforming a blood solution to less soluble dry blood.

FIGURE 3 is an end elevation view of the nozzle arrangement for contacting a blood solution and a hot gas; and FIGURE 4 is a side elevation view of said nozzle arrangement.

In this invention soluble blood in an aqueous medium is the starting material, i.e., blood solution 10. This blood normally will be fresh blood from the killing room floor but it may be reconstituted blood prepared from blood powder, or it may be a combination of fresh blood and dissolved blood powder in aqueous solution. The starting material may also contain some low solubility blood in suspension such as might be obtained from recycling the solids fines from a drier apparatus. It has been found that blood from various animal, poultry and marine sources is useful and adaptable to the process here described.

To carry out the process the blood solution 10 is intermixed with and heated by steam 11 in a gaseous medium 12 to form therein a less soluble blood 13. The temperature of the aqueous blood solution must be elevated to above about 120° F., preferably to a temperature between about 160° F. to 180° F. The upper temperature limit for this heat-treating step is the temperature at which decomposition of the blood takes place. An upper operable working temperature for the aqueous blood solution is in the temperature range of about 200° F. to 220° F.

After this initial heating, the blood may be cooled and then immediately used for processing to an adhesive 14, but it is generally desirable to further reduce the solubility by continued heat treatment as in step 15. This can be done by transferring the blood to a heat-retaining chamber. In this chamber the heated blood is maintained at a temperature above about 120° F. for a period of time sufficient to further reduce the solubility to the desired point. This step of maintaining the blood at an elevated temperature for a period of time permits the partially insolubilized blood to attain a uniform temperature throughout the mass, thereby providing more uniform solubility characteristics. It also provides a convenient control or governing means for producing blood to a predetermined solubility. The blood is at a temperature above about 120° F. for a preferred time period of approximately 10 to 300 seconds.

When the blood is discharged from the heat-retaining chamber, it usually is homogenized at step 16 to condition it for conveying cooling or drying. Homogenization has been found desirable to reduce the clots, globules and curds of the low solubility blood to a homogeneous, paste-like condition which facilitates heat transfer and pumping. Under certain conditions, such as limited solubility reduction, or low solids starting material, it is possible to eliminate the homogenizing step, or to use a simple milling operation.

Upon discharge from the homogenizer or the heat-retaining chamber, the low solubility blood is preferably cooled at step 17 by passing it through a cooling chamber capable of reducing the temperature to below about 120° F. and preferably below about 100° F.

The slurry of water and blood of reduced solubility may be processed to an adhesive immediately after discharge from the cooler. It is preferable, however, to dry this material to avoid putrefaction through bacterial action. Drying is particularly important if the blood is to be stored for a prolonged period prior to use.

Various means for drying the insolubilized blood may be used. Spray drying is normally preferred for the production of dried blood and this invention is well suited for use in conjunction with commercial spray-drying equipment. When spray-drying is employed, it has been found desirable to use a centrifugal atomizer to disperse the insolubilized blood in the hot air stream within the drier as at step 18.

Other drying means may be used. For example, the blood can be dried at lower temperatures such as in a vacuum chamber or air dried at room temperature.

Less soluble blood of this invention may be subjected to a further insolubilizing temperature while it is being dried. This is accomplished by using drying conditions 20 that will heat-treat the blood while the water is being removed therefrom.

For optimum storage conditions of the dried blood product the moisture content should be below about 20% by weight.

The apparatus for processing the blood solution to a less soluble blood comprises means 32 to mix the blood solution with a steam in a gaseous medium. This means comprises a centrally positioned pipe 33, and a pipe 34 which branches into two arms 35. The pipe 33 normally conveys the blood solution and the pipes 34 and 35 normally convey the steam. On the lower end of each arm 35 is an inwardly directed finger 36. The end of each finger is formed into a fan-shaped nozzle 37 so as to distribute the steam in a fan-shaped stream. The two nozzles 37 are directed downwardly and inwardly so that the fan-shaped stream of steam issuing from one nozzle impinges on the fan-shaped steam of steam issuing from the other nozzle. The pipe 33 is directed downwardly and terminates in a fan-shaped nozzle 38 so as to distribute blood solution in a fan-shaped stream. In effect, the nozzle 38 directs a stream of blood solids in aqueous solution in the direction of two converging streams of steam, and which streams impinge on and mix with said blood solution stream and substantially instantaneously provide a blood solution temperature above about 120° F. and up to about 220° F., depending on the temperature of the steam and the temperature of the blood solution. It will also be understood that the volume of steam relative to the feed volume of the blood solution will govern the degree of attained temperature increase. Through varying such factors as temperature and feed volume, a degree of control over the function of the process is obtained.

Associated with the pipes 33 and 35 is a bracket 40 for positioning the pipes with respect to each other. In the pipe 34 is a valve 41 and attached to this pipe is a gauge 42 for indicating the flow of hot gas. In the pipe 33 is a valve 43 and attached to this pipe is a gauge 44 for indicating the flow of the blood solution.

Normally, the major part of the mixing means 32 is positioned so that the nozzles 37 and 38 direct the streams issuing therefrom into a heat treatment chamber 30. In the chamber is a screw conveyer 31, driven by suitable means, to convey the hot blood. The screw conveyer runs the length of the chamber 30.

The chamber 30 is at an incline, with the blood solution and the hot gas being introduced at the upper part of the lower end.

The nozzles 37 and 38 normally terminate inside the chamber and approximately 1 to 3 inches above the top of the screw conveyer. This 1 to 3 inch space between the nozzles and screw conveyer is the place where the blood solution 10 and hot gas mix 11 mix, so that the blood solution becomes less soluble blood. The blood solution and the hot gas mix within a gaseous medium. The blood is substantially instantaneously heated to above about 120° F. The less soluble blood falls onto the screw conveyer 31 whereby it is agitated and moved toward the other end of the chamber.

The hot blood leaves the chamber at 46 and flows to a homogenizer 47 wherein it is transformed into semi-fluid paste. From the homogenizer 47 the blood is sent to a heat exchanger 48.

In the heat exchanger 48 the blood is cooled to a temperature less than about 120° F. so as to terminate the insolubilization of the blood.

The heat exchanger may take many forms. For example, it may have a screw 50 for moving the homogenized blood. The exchanger may be jacketed for external cooling and the screw may be of hollow construction for the flow of a coolant therethrough. From the heat exchanger the cooled homogenized blood is introduced into a drier 51 for decreasing the moisture content.

A satisfactory drier for this purpose is a spray drier having a centrifugal atomizer. The drier is operated so as to have a hot gas inlet temperature in the range of about 300° F.–700° F. and a gas outlet temperature in the range of approximately 120° F.–350° F.

In a modification of the apparatus the spray means 32 may be positioned directly above the atomizer of the spray drier 51 so that the blood solution is mixed with steam in a gaseous medium to form the less soluble blood. This blood is thereby introduced directly into the drier.

Having presented a specific description of the process there are now presented some examples. It is to be understood that these examples are by way of illustration only and are not to be taken as limitations on the process.

EXAMPLE I

Fresh beef blood from the killing room floor having a solids content of about 18 percent by weight was admixed with steam in a gaseous medium. The blood in a stream pattern was admixed with two opposed streams of steam. The steam was at a pressure of about 24 p.s.i.g. corresponding to a temperature of about 265° F. The liquid blood was fed at a rate of approximately 4080 pounds per hour, and was heated in the gaseous medium to a temperature of about 175° F. to form the less soluble blood.

The less soluble blood, at an initial temperature of about 175° F., was held in an insulated chamber for about 120 seconds. The exit temperature of the hot less soluble blood from this chamber was about 168° F. The less soluble blood was moved through the chamber by means of a screw conveyer. In addition to moving the blood the screw conveyer agitated the blood. Next, the hot less soluble blood was homogenized. This homogenized blood was cooled to a temperature of about 114° F. The blood had a total solids content of about 18.4 percent by weight, and was about 18.7 percent soluble in water.

The cooled homogenized blood was introduced into a spray drier at a rate of about 750 pounds per hour of blood solids. This spray drier has a centrifugal atomizer. The temperature of the air entering the drier was approximately 400° F. and the temperature of the air leaving the drier was about 205° F.

The blood product leaving the drier was a finely divided, free-flowing powder, of a dark-reddish brown color, and was about 17.4 percent soluble in water.

EXAMPLE II

Fresh beef blood from the killing room floor having a solids content of about 18 percent by weight was admixed with steam in a gaseous medium. The blood in a stream pattern was admixed with two opposed streams of steam. The steam was at a higher pressure than in Example I. The liquid blood solution was fed at a rate of approximately 4080 pounds per hour, and was heated in the gaseous medium to a temperature of about 185° F. to form less soluble blood.

The less soluble blood at an initial temperature of about 185° F. was held in an insulated chamber for about 120 seconds. The exit temperature of the hot blood from this chamber was about 174° F. The blood was moved through the chamber by means of a screw conveyer. In addition to moving the blood the screw conveyer agitated the blood.

Next, the blood was homogenized. This homogenized blood was cooled to a temperature below 120° F., and had a solids content of about 21.1 percent by weight and was about 8.8 percent soluble in water.

EXAMPLE III

Other low solubility bloods were produced by varying the ratios of steam to blood solids within the gaseous medium, the residence time in the chamber and the air temperatures in the spray drier. The Table I shows the solubility of various blood samples produced and the resulting viscosity data from the alkaline dispersibility test.

*Table I*

| Characteristic | Example | | |
|---|---|---|---|
| | A | B | C |
| Moisture Content, percent | 5.0 | 6.3 | 7.2 |
| Water Solubility, percent | 11.4 | 9.0 | 22.1 |
| Alkaline Viscosity, cps | 3,300 | 12,500 | 5,100 |

EXAMPLE IV

Fresh beef blood from the killing room floor having a solids content of about 18 percent by weight was admixed with steam in a gaseous medium. The blood in a stream pattern was admixed with two opposed streams of steam. The steam was at a pressure in the range of about 22–24 p.s.i.g. corresponding to a temperature in the range of about 260° F.–265° F. The liquid blood was fed at a rate of approximately 4080 pounds per hour, and was heated in the gaseous medium to a temperature of about 170° F. to 175° F. to form less soluble blood.

The less soluble blood, at an initial temperature in the range of about 170° F.–175° F., was held in an insulated chamber for about 120 seconds. The exit temperature of the hot blood from this chamber was in the range of about 165° F.–168° F. The blood was moved through the chamber by means of a screw conveyer. In addition to moving the blood, the screw conveyer agitated the blood.

The hot blood was homogenized and then cooled to about 114° F.

The cooled, homogenized blood was introduced into a spray drier at a rate of about 750 pounds per hour of blood solids. This spray drier had a centrifugal atomizer. The temperature of the air entering the drier was approximately 400° F. and the temperature of the air leaving the drier was about 180° F.

The less soluble blood product leaving the drier was a finely divided, free-flowing powder, of a dark-reddish brown color, and was about 22.1 percent soluble in water and had a moisture content of about 7.2 percent.

A glue-mix was prepared from the powdered blood. The following mixing procedure was used in preparing this glue-mix.

| Component: | Parts by weight |
|---|---|
| Water at 100° F. | 2000 |
| Defoamer, pine oil | 8 |
| Low solubility powdered blood | 338 |
| Wood flour | 172 |
| Mix two minutes. | |
| Sodium hydroxide solution (50% aqueous solution) | 80 |
| Mix five minutes. | |
| Water at 60° F. | 1400 |
| Mix two minutes. | |
| Calcium hydroxide (33⅓% suspension in water) | 156 |
| Mix two minutes. | |
| Sodium silicate (N grade solution from Philadelphia Quartz Company) | 180 |
| Mix three minutes. | |

This wet adhesive was used to prepare plywood panels by the cold pressing technique. Douglas fir polywood core veneers, ³⁄₁₆″ thickness, were coated with the adhesive uniformly on both sides at the rate of 140–145 pounds of wet glue per 1000 square feet of double glue line. These cores were placed between ⅛″ thick face veneers in conventional plywood fashion.

The panels were pressed after assembly times of 3, 10, 18 or 25 minutes. Pressing was accomplished at room temperature by subjecting the panels to continuous pressure of 185 p.s.i. (pounds per square inch) in a hydraulic press. Pressure was maintained for 15 minutes, thereafter the panels were allowed to dry in a stack for two days before testing.

The panels were submitted to the Douglas Fir Plywood Association's test for interior plywood as described in Commercial Standard CS 45–55, as modified by Amendment No. I thereto, effective March 20, 1959. All panels passed the test with a score of 100 percent.

The low solubility blood product of this invention, normally in the dry state, is particularly useful in the formulation of polywood adhesives. For this application the dried blood material should be between about 5 percent and about 25 percent soluble in water, preferably between about 8 percent and 14 percent soluble. The moisture content of the dry blood powder should be below about 20 percent by weight and preferably between about 6 percent and 8 percent by weight.

The moisture content of a dry blood sample, or the solids content of a blood solution, is determined by accurately weighing approximately a one-gram sample into an aluminum or glass dish and drying the sample for one hour in an oven at 135° C. The dish should then be cooled in a dessicator, weighed and the moisture content calculated.

The solubility of blood in water is determined by mixing a known amount of blood solids in distilled or deionized water. The insoluble matter is allowed to settle and the solids content of the supernatant liquid is determined by withdrawing a known weight of the supernatant liquid, placing it in a weighing dish and evaporating the liquid to a constant weight at a temperature of 135° C. By weighing the residue in the dish the solubility of the original blood material can be determined. The blood product should be between about 5 percent and 25 percent soluble in water and should be dispersible in a cold aqueous, alkaline solution.

The dispersibility of low solubility blood in cold aqueous alkaline solution is determined by stirring 24 grams of the blood powder, or the equivalent amount if the blood is wet, in enough water to make 165 grams of a water-blood mixture. To prevent foaming during stirring, a few drops of n-amyl alcohol may be added. To this water-blood mixture add 75 ml. of 1.0 N NaOH solution. While stirring, the temperature of the water-blood mixture is adjusted at 25° C. The viscosity of the alkaline water-blood mixture is measured five minutes after adding the sodium hydroxide by a Brookfield viscometer rotating at 20 r.p.m. (revolutions per minute). A viscosity of at least 100 cps. (centipoises) indicates adequate alkaline dispersibility.

Although in FIGURE 2 the chamber 30 is illustrated as being inclined upwardly it is to be realized the chamber may be level or inclined downwardly.

Because of the heat transfer from the hot gas to the blood solution so as to transform the latter to a less soluble blood it is necessary to have a gas which can give up a large quantity of heat in a restricted temperature range. Steam, either saturated or superheated, from this standpoint is a desirable hot gas. Steam can condense to a liquid and in so doing release its latent heat. Because of this latent heat characteristic steam is used.

Having presented our invention what we claim is:

1. A method of reducing the water solubility of water soluble blood solids so that 50–95% of the total blood solids are insoluble in water to adapt said blood solids of reduced water solubility for adhesive use, comprising the step of atomizing a stream of an aqueous solution of water soluble blood solids with a blast of steam to thereby instantly elevate the temperature of said solution into the range of from 120–220° F. and maintaining said elevated temperature for a period of at least about 10 seconds, said atomization and elevated temperature treatment reducing the water solubility of said blood solids.

2. The method of claim 1 in which said blood solids of reduced water solubility provided by said atomization and elevated temperature treatment are dried to a moisture content less than about 20% by weight.

3. The method of claim 1 in which said aqueous solution of blood solids is maintained at said elevated temperature for a period up to about 300 seconds.

References Cited in the file of this patent

UNITED STATES PATENTS

| | | |
|---|---|---|
| 1,468,313 | Lux | Sept. 18, 1923 |
| 1,777,160 | Biddle | Sept. 30, 1930 |
| 1,973,270 | Schulwitz | Sept. 11, 1934 |
| 2,014,167 | Bowen | Sept. 10, 1935 |
| 2,156,924 | Schneider | May 2, 1939 |
| 2,770,616 | Cohn | Nov. 13, 1956 |
| 2,793,203 | Schultze et al. | May 21, 1957 |
| 2,863,771 | Ferrara | Dec. 9, 1958 |

OTHER REFERENCES

Senti et al.: Journal of the American Chemical Society (December 1943), volume 65, page 2473.